(12) United States Patent
Ohira

(10) Patent No.: US 7,447,265 B2
(45) Date of Patent: Nov. 4, 2008

(54) IMAGE PROCESSING APPARATUS, IMAGE PROCESSING METHOD, COMPUTER-READABLE RECORDING MEDIUM, AND PROGRAM FOR PERFORMING MOTION VECTOR SEARCH PROCESSING

(75) Inventor: Tadashi Ohira, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 10/217,402

(22) Filed: Aug. 14, 2002

(65) Prior Publication Data

US 2003/0039311 A1    Feb. 27, 2003

(30) Foreign Application Priority Data

Aug. 21, 2001    (JP) ............................. 2001-250393
Jul. 16, 2002    (JP) ............................. 2002-207399

(51) Int. Cl.
H04B 1/66    (2006.01)
H04N 7/12    (2006.01)

(52) U.S. Cl. .............................................. 375/240.16

(58) Field of Classification Search ................
375/240.12–240.17, 240.19, 240.18; 348/699–700, 348/416.1; 382/236, 238; 386/109, 111; H04N 7/12; H04B 1/66

See application file for complete search history.

(56) References Cited

U.S. PATENT DOCUMENTS

| | | | | |
|---|---|---|---|---|
| 5,565,922 A | * | 10/1996 | Krause | 375/240.14 |
| 5,579,050 A | * | 11/1996 | Jung | 375/240.14 |
| 5,657,087 A | * | 8/1997 | Jeong et al. | 375/240.16 |
| 5,774,593 A | * | 6/1998 | Zick et al. | 382/236 |
| 5,872,604 A | * | 2/1999 | Ogura | 348/699 |
| 6,005,981 A | * | 12/1999 | Ng et al. | 382/240 |
| 6,256,343 B1 | * | 7/2001 | Suzuki | 375/240 |
| 6,263,024 B1 | * | 7/2001 | Matsumoto | 375/240.16 |
| 6,307,970 B1 | * | 10/2001 | Schuyler et al. | 382/236 |
| 6,480,670 B1 | * | 11/2002 | Hatano et al. | 386/109 |
| 6,785,331 B1 | * | 8/2004 | Jozawa et al. | 375/240.12 |
| 6,859,494 B2 | * | 2/2005 | Panusopone et al. | 375/240.16 |
| 6,898,244 B1 | * | 5/2005 | Takahashi | 375/240.16 |
| 2003/0039311 A1 | * | 2/2003 | Ohira | 375/240.16 |

* cited by examiner

*Primary Examiner*—Tung Vo
(74) *Attorney, Agent, or Firm*—Fitzpatrick, Cella, Harper & Scinto

(57) ABSTRACT

An image processing apparatus, comprising a first motion vector detecting unit for searching for a motion vector in a fixed search range on the basis of image data of the input current frame and image data of the previous frame, a second motion vector detecting unit for setting a search range for performing the motion vector search according to the previously detected motion vector and for performing a motion vector search within the set search range on the basis of the image data of the current frame and the image data of the previous frame, and a selecting unit for selecting a process with the first motion vector detecting unit and a process with the second motion vector detecting unit.

3 Claims, 15 Drawing Sheets

IMAGE PROCESSING APPARATUS, IMAGE PROCESSING METHOD, COMPUTER-READABLE RECORDING MEDIUM, AND PROGRAM FOR PERFORMING MOTION VECTOR SEARCH PROCESSING

BACKGROUND OF THE INVENTION

1. Field of the Invention

The present invention relates to an image processing apparatus, an image processing method, a computer-readable recording medium, and a program and particularly to motion vector search processing.

2. Related Background Art

Conventionally, a block matching method is frequently used as a motion vector search method in a motion compensation inter-frame prediction coding method. This block matching method includes matching a motion search block (N×N pixel area) with an image within a limited search range in a reference image at every position on a pixel basis, calculating a matching evaluation function, and determining the best matching position to be a search motion vector.

As the matching evaluation function, a sum of absolute values of differences between pixel values, obtained on a pixel to pixel basis all pixels in the block (the sum of absolute difference) is used for example.

The block matching method, however, has a problem that if the system is realized, an enormous amount of calculation is required due to a high frequency of a search, while it is useful to search for a vector having the highest degree of similarity within the search range. Therefore, there are suggested various simplification technics such as a method of searching with multiple steps (it is referred to as 3-step search method: refer to "Motion Compensation Inter-frame Coding of Conference Television Signals" (Technical Report of IEICE IE81-54 1981-7), for example).

In the 3-step search method, first, a search is made at rough search-point intervals as the first step and then the second search is made at search-point intervals each of which is a half of the interval for the first step around the best matching position, instead of the all-pixel position search. The same process is repeated in a plurality of steps to narrow the coarse search-point intervals to close ones, thereby searching for a motion vector.

As mentioned above, the block matching method requires an enormous amount of calculation. Although the 3-step search method is useful to reduce the amount of calculation remarkably in comparison with matching all search ranges one by one, it causes a user to find out a motion vector quite different from those in the originally required direction if he/she makes an incorrect search in the first step.

Furthermore, supposing that a moving area is an area moving in a frame and that a static area is an area remains stationary therein, it should be noted that each area is apt to be fixed in a single animation sequence due to the usage, as to a lot of types of images on a low-speed line for a videophone, a video conference, or the like.

SUMMARY OF THE INVENTION

With a view to the above background, it is an object of the present invention to provide an image processing apparatus an image processing method, a computer-readable recording medium, and a program, which are capable of searching for a motion vector at higher speed and more conveniently than the conventional ones.

Therefore, in accordance with one aspect of the present invention, there is provided an image processing apparatus, comprising: first motion vector detecting means for searching for a motion vector in a fixed search range on the basis of image data of the input current frame and image data of the previous frame, second motion vector detecting means for setting a search range for performing the motion vector search according to the previously detected motion vector and for performing a motion vector search within the set search range on the basis of the image data of the current frame and the image data of the previous frame, and selecting means for selecting a process with the first motion vector detecting means and a process with the second motion vector detecting means.

In accordance with another aspect of the present invention, there is provided an image processing method comprising: a first motion vector detecting step of searching for a motion vector in a fixed search range on the basis of image data of the input current frame and image data of the previous frame, a second motion vector detecting step of setting a search range for performing the motion vector search according to the previously detected motion vector and for performing a motion vector search within the set search range on the basis of the image data of the current frame and the image data of the previous frame, and a selecting step of selecting a process in the first motion vector detecting step and a process in the second motion vector detecting step.

In accordance with still another aspect of the present invention, there is provided a computer-readable recording medium, which records a program to cause a computer to execute a first motion vector detecting step of searching for a motion vector in a fixed search range on the basis of image data of the input current frame and image data of the previous frame, a second motion vector detecting step of setting a search range for performing the motion vector search according to the previously detected motion vector and for performing a motion vector search within the set search range on the basis of the image data of the current frame and the image data of the previous frame, and a selecting step of selecting a process in the first motion vector detecting step and a process in the second motion vector detecting step.

In accordance with another aspect of the present invention, there is provided a program for causing a computer to execute a first motion vector detecting step of performing a motion vector search in a fixed search range on the basis of image data of the input current frame and image data of the previous frame, a second motion vector detecting step of setting a search range for performing the motion vector search according to the previously detected motion vector and for performing a motion vector search within the set search range on the basis of the image data of the current frame and image data of the previous frame, and a selecting step of selecting a process in the first motion vector detecting step and a process in the second motion vector detecting step.

Other objects, features and advantages of the invention will become apparent from the following detailed description taken in conjunction with the accompanying drawings.

DESCRIPTION OF THE PREFERRED EMBODIMENTS

The preferred embodiments of the present invention will now be described in detail hereinafter with reference to the accompanying drawings.

First Embodiment

Figure 1:
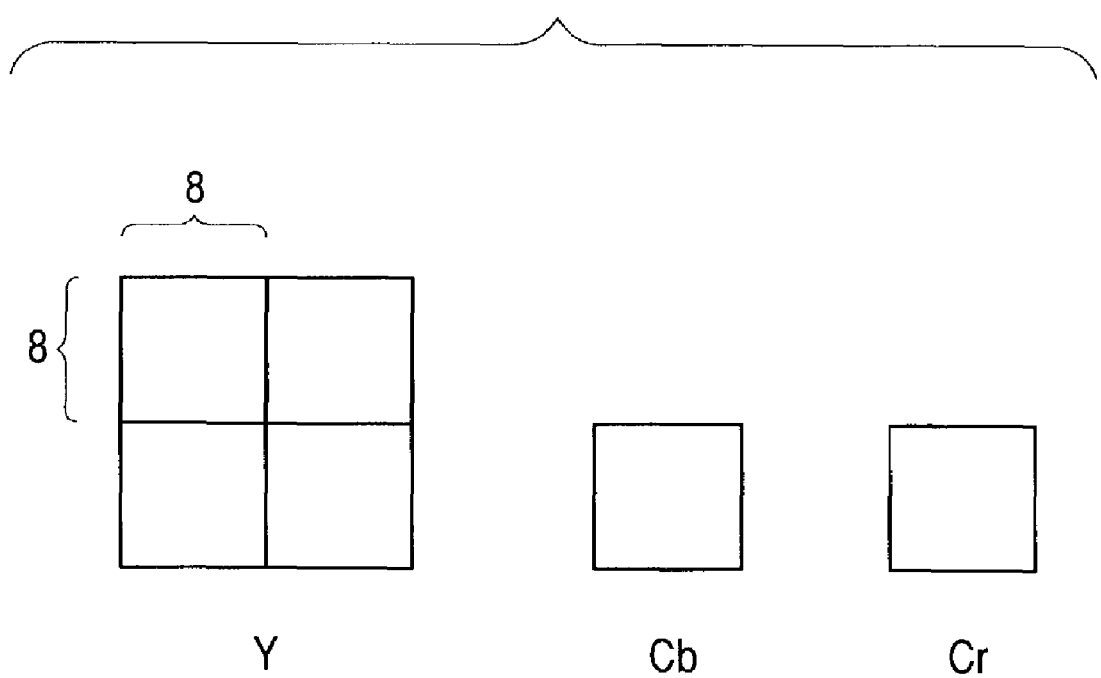
FIG. 1 is a diagram of assistance in explaining a configuration of a macro block.

First, the description of this embodiment begins with how the invention is realized in an MPEG-F encoding method. In the MPEG-4 method, a natural image is referred to as video object (VO). The VO comprises of a plurality of video object planes (VOP) photographed at given times. The VOP corresponds to a frame and is a basic unit of video data treated in the MPEG-4. The VOP is divided into macro blocks (MB), which are basic process units. In the case of MPEG-4 version 1, the macro block consists of four luminance blocks and two color difference blocks so as to support an image format of 4:2:0. A configuration of the MPEG-4 macro block is shown in FIG. 1.

The VOP in which all MBs are intra-encoded (intra-picture encoding) is referred to as I-VOP, and a frame which includes an inter-encoding (inter-picture encoding) among the MB encoding modes is referred to as P-VOP. Only these two encoding modes are used in this embodiment.

In addition, a group of a plurality of frames is referred to as GOV (group of VOP), always including an I-VOP by a single frame only.

A first search mode described hereinafter is a motion vector search method for applying a block matching method to a predetermined fixed search range (static specified-range block matching) and a second search mode is a motion vector search method for applying a block matching method to a search range (variable search range) set based on an absolute value of the previously obtained motion vector value (dynamic specified-range block matching).

Figure 2:
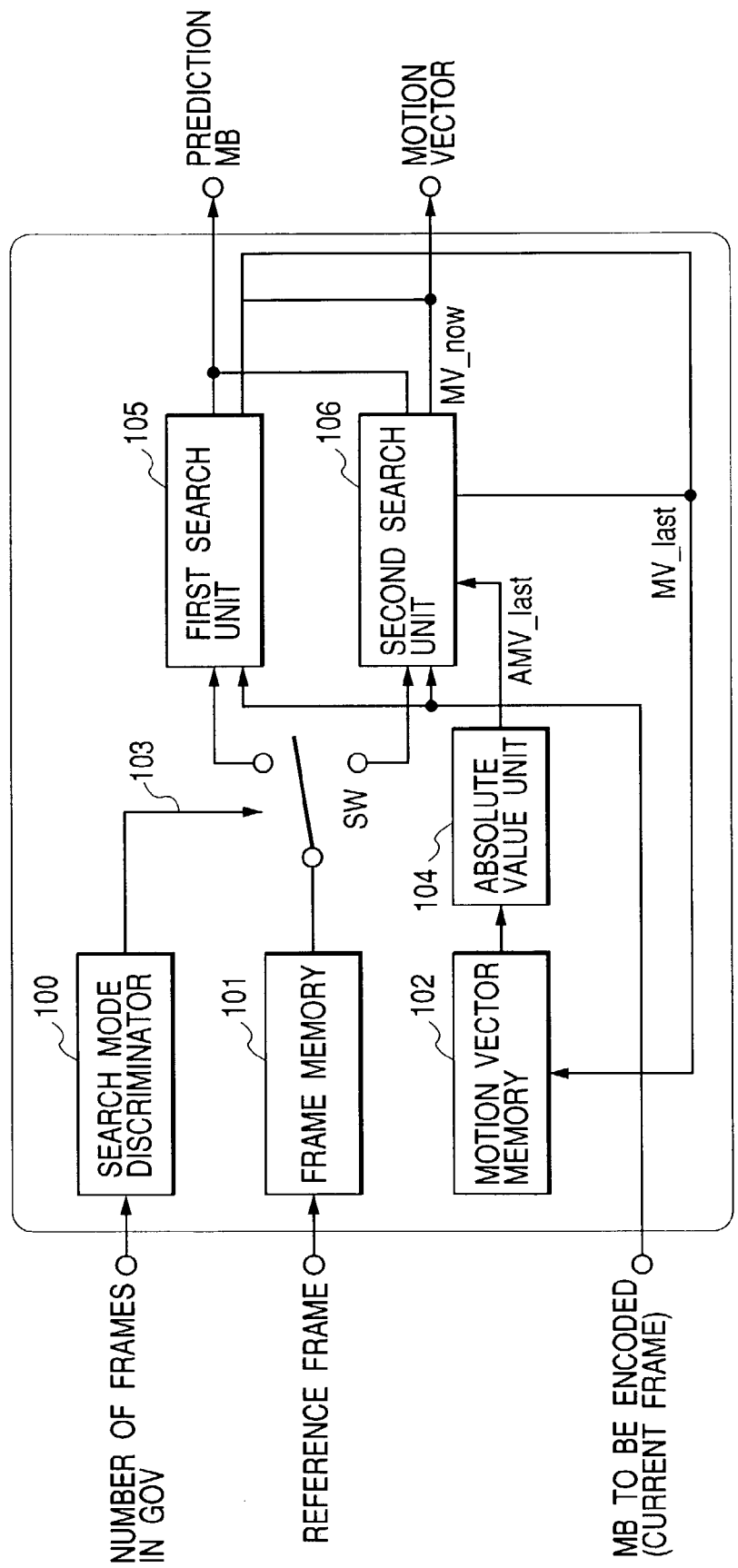
FIG. 2 is a block diagram illustrating a configuration of a motion vector search device according to a first embodiment of the present invention.

Referring to FIG. 2, there is shown a block diagram showing a configuration of a motion vector search device for a motion vector search according to the first embodiment of the present invention.

In FIG. 2, a search mode discriminator 100 discriminates between the first search mode and the second search mode on an input frame basis according to the number of input frames in GOV. A frame memory 101 stores the previous frame. A motion vector memory 102 stores the motion vector MV_last searched at the previous frame. A switch 103 switches over an output destination of the frame read from the frame memory 101 according to a control signal from the search mode discriminator 100.

An absolute value unit 104 outputs an absolute value AMV_last of the motion vector of the previous frame output from the motion vector memory 102. A first search unit 105 searches a previously specified fixed range with the block matching method to search for a motion vector according to the current frame MB and a reference frame from the frame memory 101 (which corresponds to the first search mode).

In this embodiment, the search range in the first search mode is assumed to cover ±16 pixels in the horizontal direction and ±16 pixels in the vertical direction.

Figure 3:
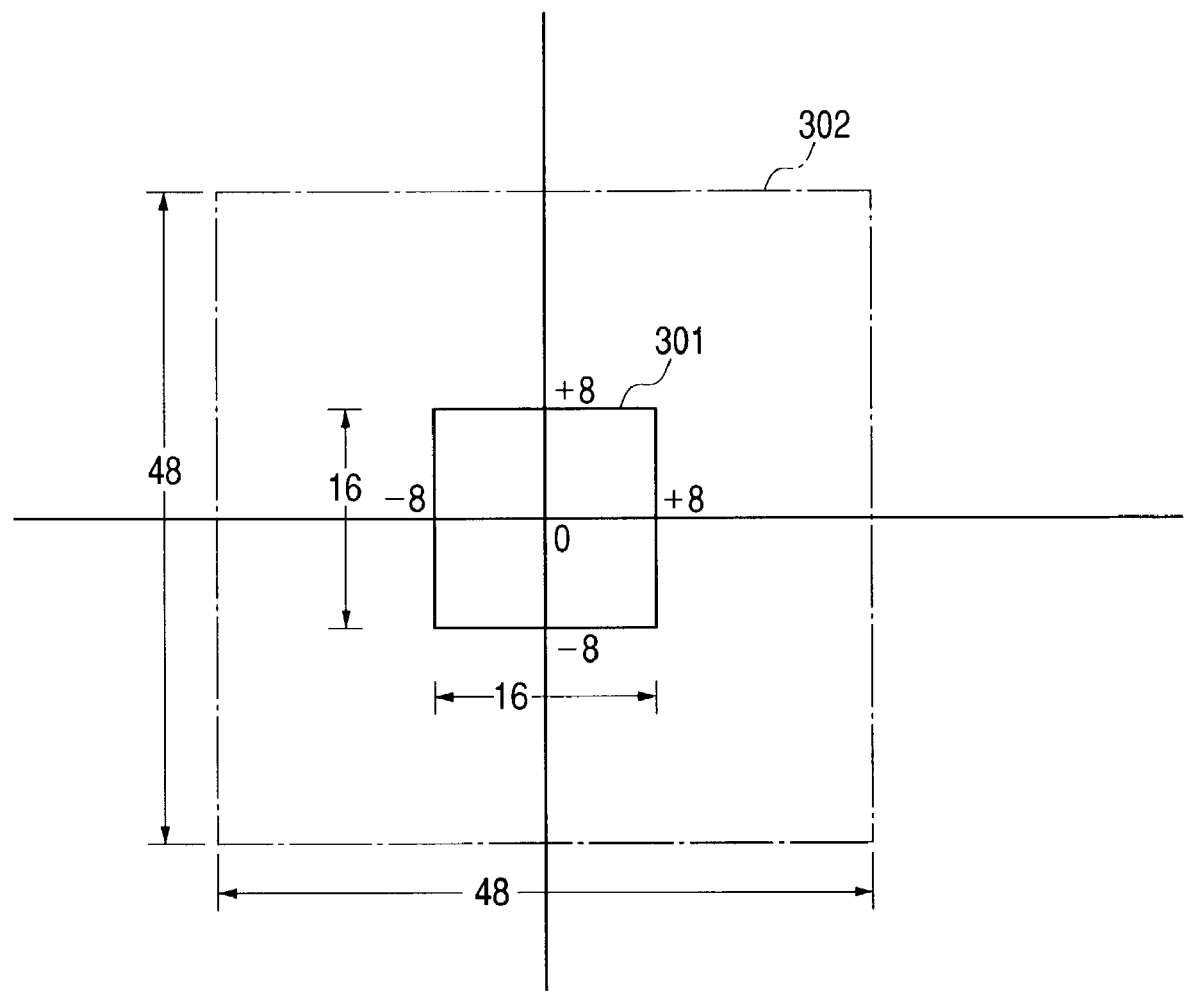
FIG. 3 is a diagram of assistance in explaining motion vector detection in a block matching method.

FIG. 3 shows a diagram of assistance in explaining the block matching method in the first search mode in this embodiment. In FIG. 3, a range denoted by a reference numeral 301 is a reference block which is a subject of the motion detection and a range denoted by a reference numeral 302 is a range subjected to the motion detection of the reference block 301.

The motion vector is detected from a sum of absolute values of frame differences between the reference block 301 of the current frame and a check block (8×8 pixels) that can be extracted within the range of the reference frame range 302. In other words, a position of the check block that generates the sum of absolute values of the minimum differences is considered to be a motion vector. While the search range is assumed to cover ±16 pixels in each of the horizontal and vertical directions in this embodiment, it is not limited thereto.

A second search unit 106 searches for a motion vector on the basis of the block matching method with a search range based on AMV_last obtained by the absolute value unit 104 (which corresponds to the second search mode). For example, if MV_last is (−13, +10), AMV_last is (13, 10). Based on it, the search range is determined to be ±13 pixels in the horizontal direction and ±10 pixels in the vertical direction around the reference block that is a subject of the motion vector detection. More detailed description will be described later.

An operation shown in FIG. 2 is then described below.

First, the search mode discriminator 100 starts a discrimination of a search method of the frame to be currently processed. The discrimination is performed on the basis of the number of frames in GOV.

Figure 4:
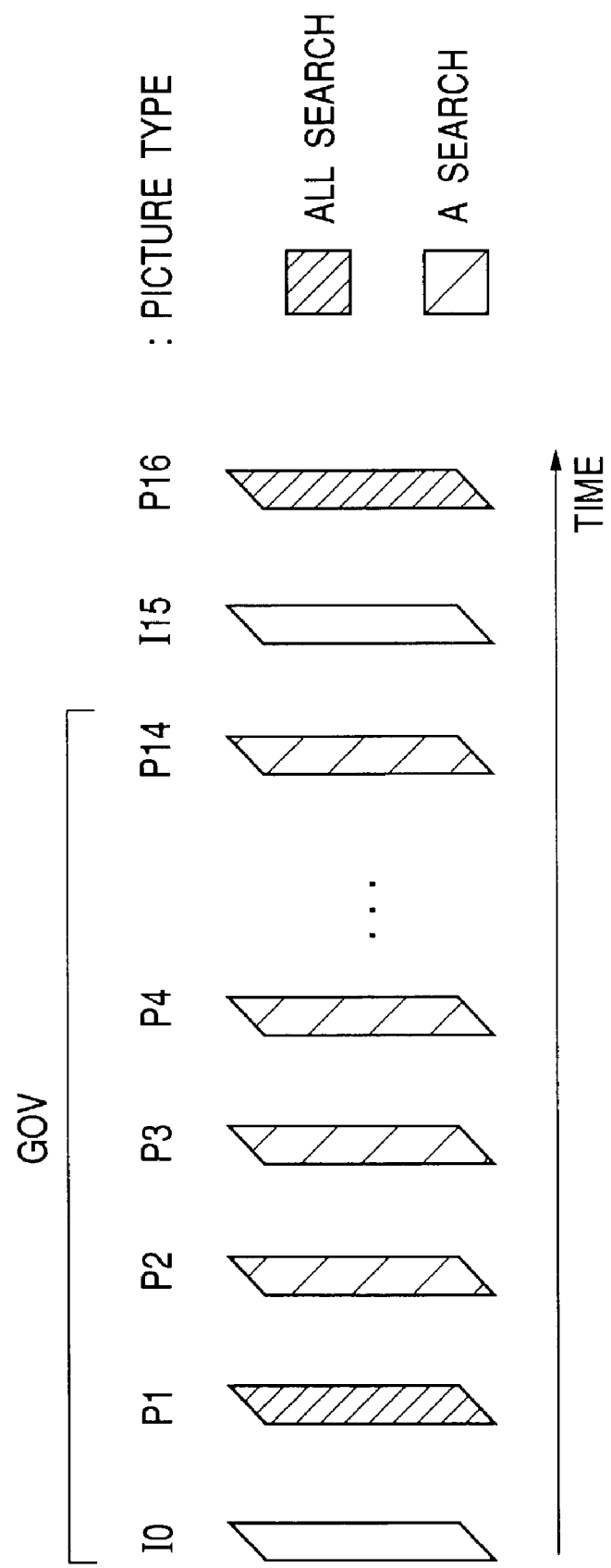
FIG. 4 is a diagram illustrating an example of a switching timing of a motion vector search mode in the first embodiment of the present invention.

In this embodiment, the search mode discriminator 100 is preset so as to select the first search mode and the second search mode in a rule as illustrated in FIG. 4. In this instance, the first search mode is applied to P-VOP immediately after I-VOP and the second search mode is applied to P-VOP in other cases. The switching timing between the first search mode and the second search mode is not limited to one in FIG. 4, but naturally the timing can be set in such a way that the first search mode is applied more than once in the GOV.

Returning to the description of the operation shown in FIG. 2, if the number of frames in the GOV is 0, the VOP is determined to be I-VOP and a local decoding frame signal is stored in the frame memory 101. If the number of frames in the GOV is 1, the VOP is determined to be P-VOP at the head of the GOV and therefore the search mode discriminator 100 outputs a control signal to the switch 103 so that an image signal from the frame memory 101 is input to the first search unit 105.

The first search unit 105 receives the image signal of the reference frame, and an MB to be encoded from the image signal of the current frame, searches the predetermined fixed search range for a motion vector with the block matching method, and outputs a prediction MB together with the motion vector MV_last as a search result. Concurrently, the motion vector MV_last is stored in the motion vector memory 102.

If the number of frames in the GOV is other than the above, the search mode discriminator 100 outputs a control signal to the switch 103 so that the image signal from the frame memory 101 is input to the second search unit 106.

The second search unit 106 receives the image signal of the reference frame from the frame memory 101, an MB to be encoded from the image signal of the current frame, and AMV_last obtained by excluding signs from the motion vector MV_last output from the motion vector memory 102 by using the absolute value unit 104. The second search unit 106 sets a search range on the basis of AMV_last and searches for a motion vector with the block matching method. Thereafter, it outputs a prediction MB as a search result and its motion vector MV_now. Therefore, the maximum value of the search range settable by the second search unit 106 is the same as the search range of the first search unit 105. For example, if the motion vector is (−6, 6) as a search result in the first search mode, the motion vector memory 102 outputs data indicating (−6, 6). Then, the absolute value unit 104 outputs it as (6, 6) and the second search unit 106 searches for a motion vector within a search range of ±6 pixels in the horizontal direction and ±6 pixels in the vertical direction around the reference block which is a subject of the motion vector detection. More detailed description will be described later.

Figure 5:
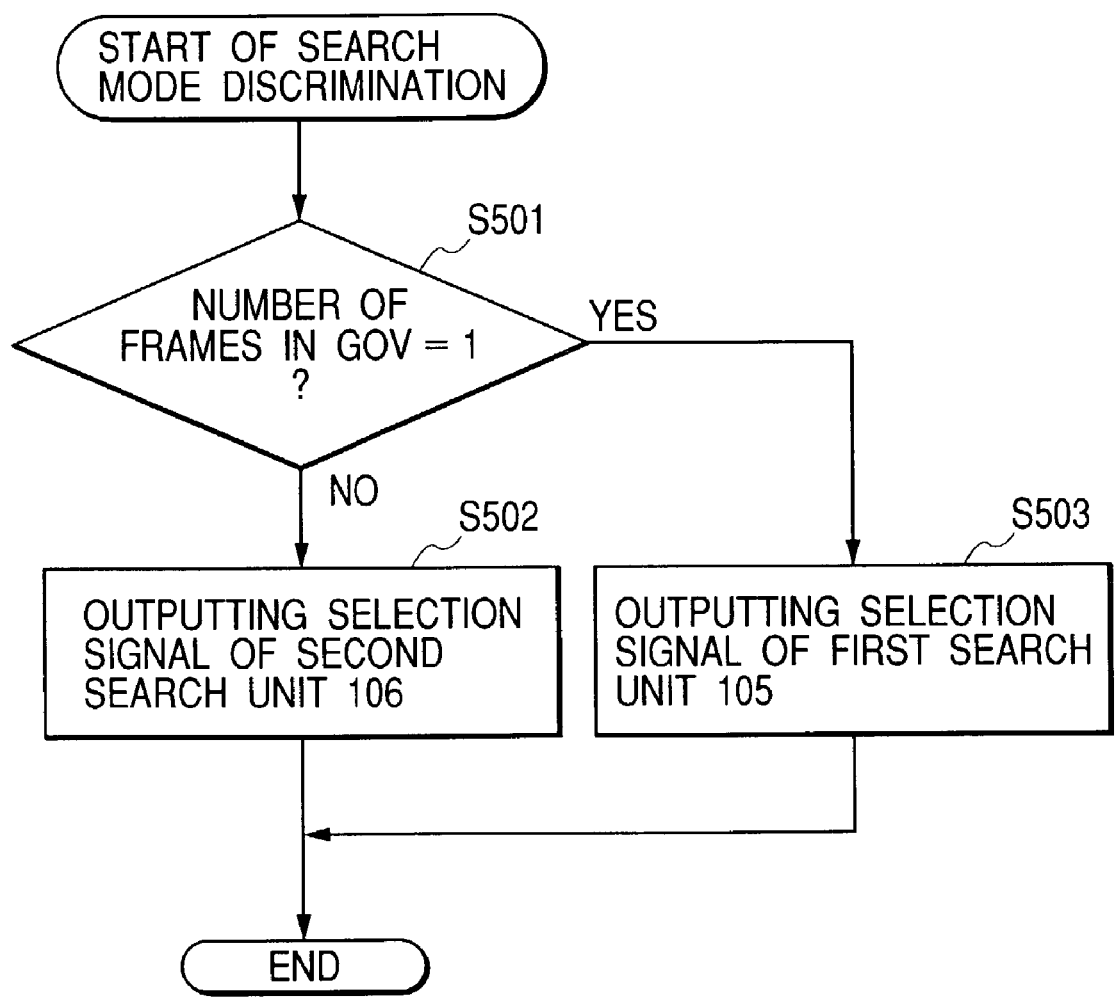
FIG. 5 is a flowchart of an operation of a search mode discriminator 100 shown in FIG. 1.

Referring to FIG. 5, there is shown a flowchart of assistance in explaining an operation of the search mode discriminator 100. It counts up the number of frames in the GOV whenever a frame is processed and determines whether the number of frames in the GOV equals one (S501). If it equals one, the search mode discriminator outputs a selection signal for selecting the first search unit 105 (S503). Otherwise, it outputs a selection signal for selecting the second search unit 106 (S502).

Figure 6:
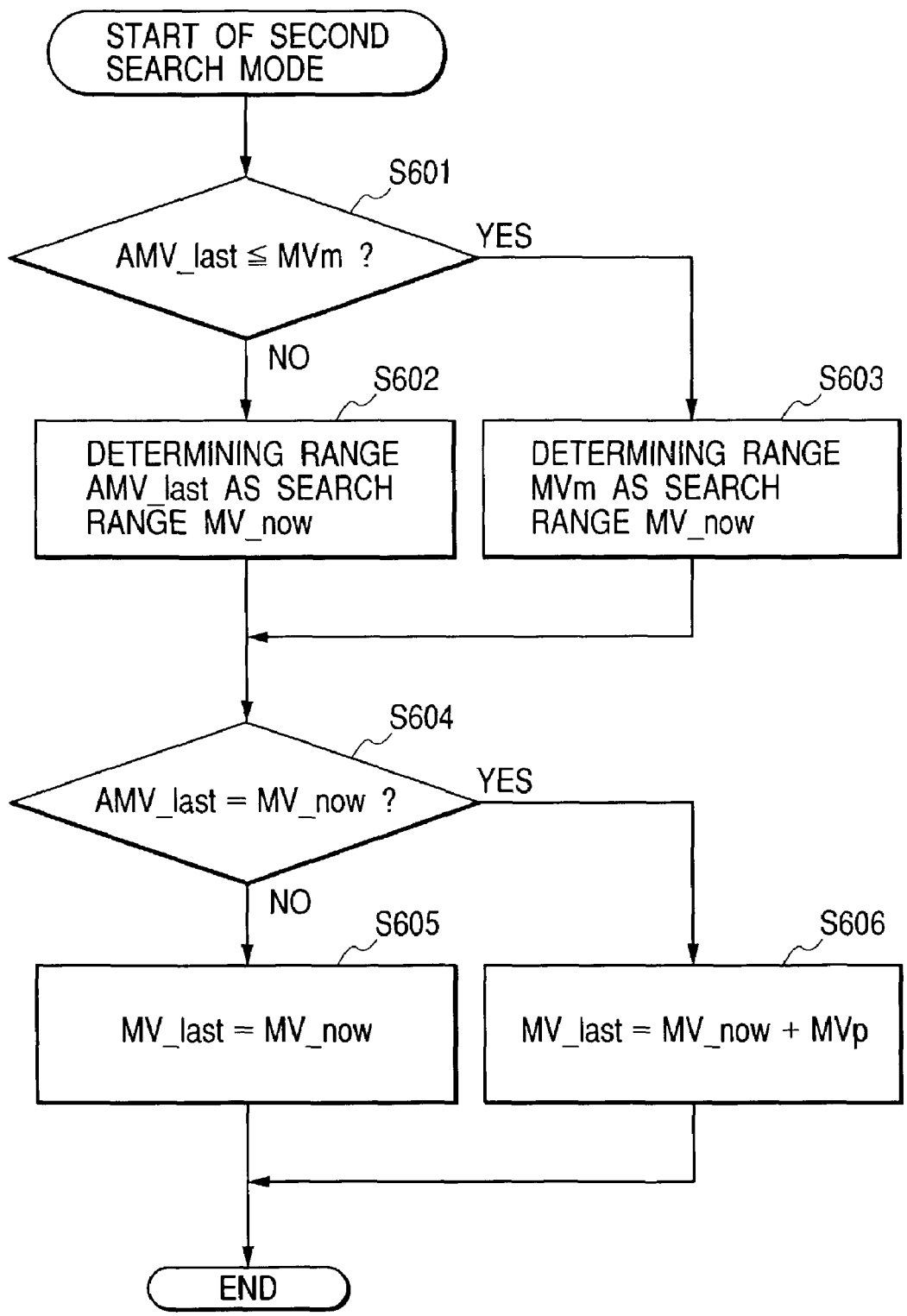
FIG. 6 is a flowchart of assistance in explaining an operation of a second search unit 106 shown in FIG. 1.

Referring to FIG. 6, there is shown a flowchart of assistance in explaining an operation of the second search unit 106.

Although only the motion vector search in the horizontal direction is described here to simplify the description, the motion vector search in the vertical direction can also be achieved in the same process as in the horizontal direction.

First, in this embodiment, assuming that MVm is the minimum search range of the motion vector, there is defined a search extension value MVp for providing an extended search range of the next frame in comparison with the search range of the current frame.

First, the motion vector MV_last in the motion vector memory is output as AMV_last whose sign is eliminated by the absolute value unit. Next, AMV_last is compared with MVm (S601).

If AMV_last is less than or equal to MVm, a search is executed within the range of −MVm to +MVm pixels to determine the motion vector MV_now of the current MB and MV_last of the same value (S603). If AMV_last is more than MVm, MV_now is determined with a search range of −AMV_ last to +AMV_last pixels (S602). If the minimum search range MVm is 3 (pixels) and MV_last is 2, for example, a search is executed in the minimum search range of −3 to +3 (pixels). If MV_last is 4 (pixels), a search is executed in the range of −4 to +4 (pixels).

Next, AMV_last of the search range is compared with the value of MV_now obtained in the above process (S604). If the AMV_last value equals the MV_now value, MV_now is output and further a value of MV_now plus MVp is output as a motion vector MV_last to be stored in the motion vector memory 102 (S606). Otherwise, MV_last is output as a value equal to Mv_now (S605).

For example, assuming that the search extension value MVp is 3 and that AMV_last is 5 and MV_now is 5, a motion vector stored in the motion vector memory 102 is 8 (=5+3) and a search range from the next frame is −8 to +8 (pixels).

In the same manner, settings are made in the vertical direction. MVm and MVp values can be either the same as or different from those in the motion vector search in the horizontal direction in the above. For a wide screen, for example, it is better that the MVm and MVp values in the vertical direction are smaller than those in the horizontal direction. In other words, the MVm and MVp values can be varied in the horizontal and vertical directions according to a value of an aspect ratio.

Figure 7:
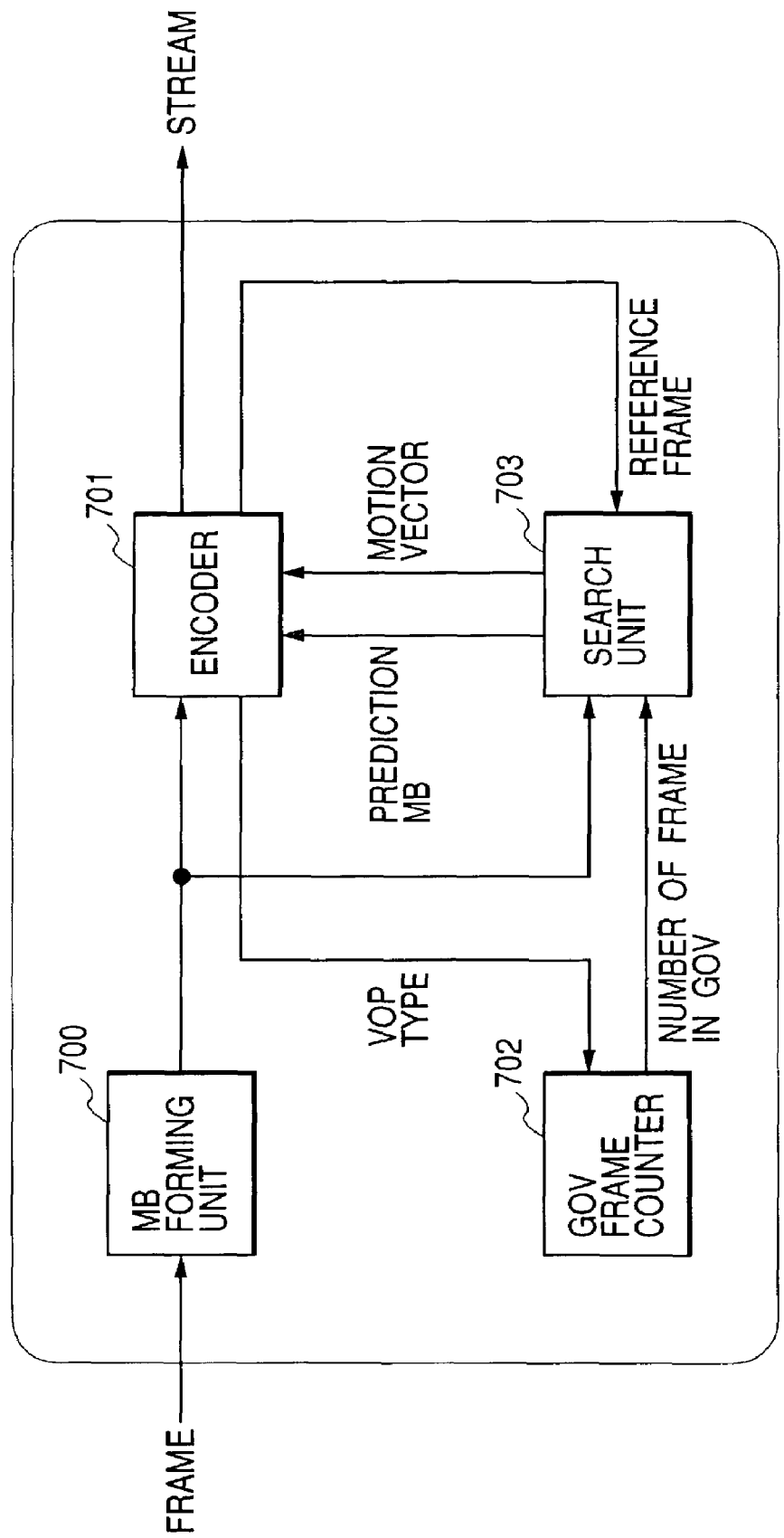
FIG. 7 is a block diagram showing a configuration of an encoding device according to the present invention.

Referring to FIG. 7, there is shown an encoding device with a search unit shown in FIG. 2.

In FIG. 7, an MB forming unit 700 divides the input frame image on an MB basis. An encoder 701 encodes the current MB according to a prediction MB obtained from the search unit 703. The encoder 701 also encodes a motion vector obtained from the search unit 703.

A GOV frame counter 702 resets the count at a timing of I_VOP existing at the head of the GOV and counts the number of frames in the GOV. The search unit 703 corresponds to the motion vector search device shown in FIG. 2.

The following describes an operation of the encoding device configured as shown in FIG. 7.

First, a frame to be encoded is input and the input frame image is divided into MBs by the MB forming unit 700. The encoder 701 encodes the input MBs to an MPEG-4 stream. The local-decoded MBs are stored in the search unit 703 as a reference frame for use in encoding of the next frame. At the next frame, the reference frame stored in the search unit 703, MBs of the current frame, and the number of frames in the GOV are input, the motion vector search is executed, and then the prediction MB and the motion vector are output.

The encoder 701 outputs the VOP type (I- or P-VOP) to the GOV frame counter 702 simultaneously with encoding. The GOV frame counter 702 counts the frames in the GOV and outputs the number of frames to the search unit 703. The above operation is repeated.

Figure 8:
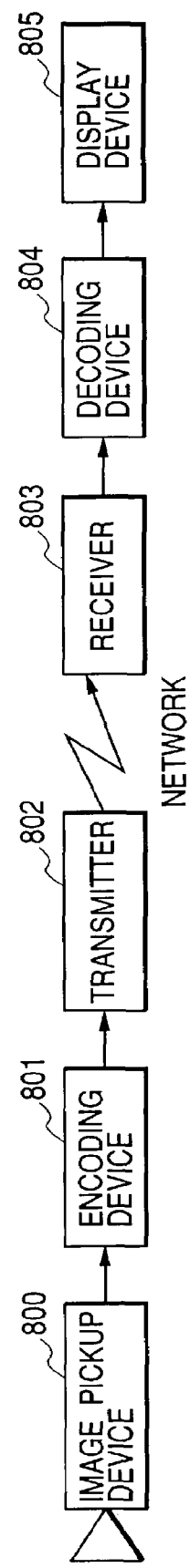
FIG. 8 is a diagram of assistance in explaining a configuration of an application system with the encoding device shown in FIG. 7.

Referring to FIG. 8, there is shown a configuration of an application system with the encoder shown in FIG. 7.

An image pickup device 800 takes an object image and outputs an image signal. An encoding device 801 is the encoding device shown in FIG. 7. A transmitter 802 converts a stream from the encoding device 801 to a signal to be transmitted to a network that is a transmission network. A receiver 803 receives the signal from the network and outputs a stream. A decoding device 804 decodes the stream from the receiver 803 to an image signal. A display device 805 displays the image signal decoded by the decoding device 804.

As apparent from the above description, according to the first embodiment, the block matching method is applied to the predetermined fixed search range (the first search mode) in the motion vector search of frames at certain unit time intervals and a search range is determined from the motion vector obtained in the block matching method for other ranges, by which a search range can be reduced and the motion vector can be searched for at higher speed and more easily (the second search mode).

Since the block matching method in the fixed search range (the first search mode) is used to determine the motion vector search range to be a basis, it is possible to expect the same effect as in the first search mode at a high probability in the second search mode.

In the above embodiment, the given search range is determined before the search range is dynamically determined to be extended further according to the conditions in the second search mode, and therefore the motion vector can be searched for at higher reliability. Even if a great motion occurs in an image at a frame to which the block matching method in the first search mode is not applied, it can be coped with by using a function of providing a larger search range to the next frame than one for the current frame.

Additionally, while the process in the first search mode is executed at a timing based on units of GOV, relative to the second search mode in the above embodiment, it can also be executed in other units. Furthermore, while the encoding mode for the motion vector is switched in units of an MB in the above embodiment, it can also be switched in units of a plurality of MBs.

Second Embodiment

Figure 9:
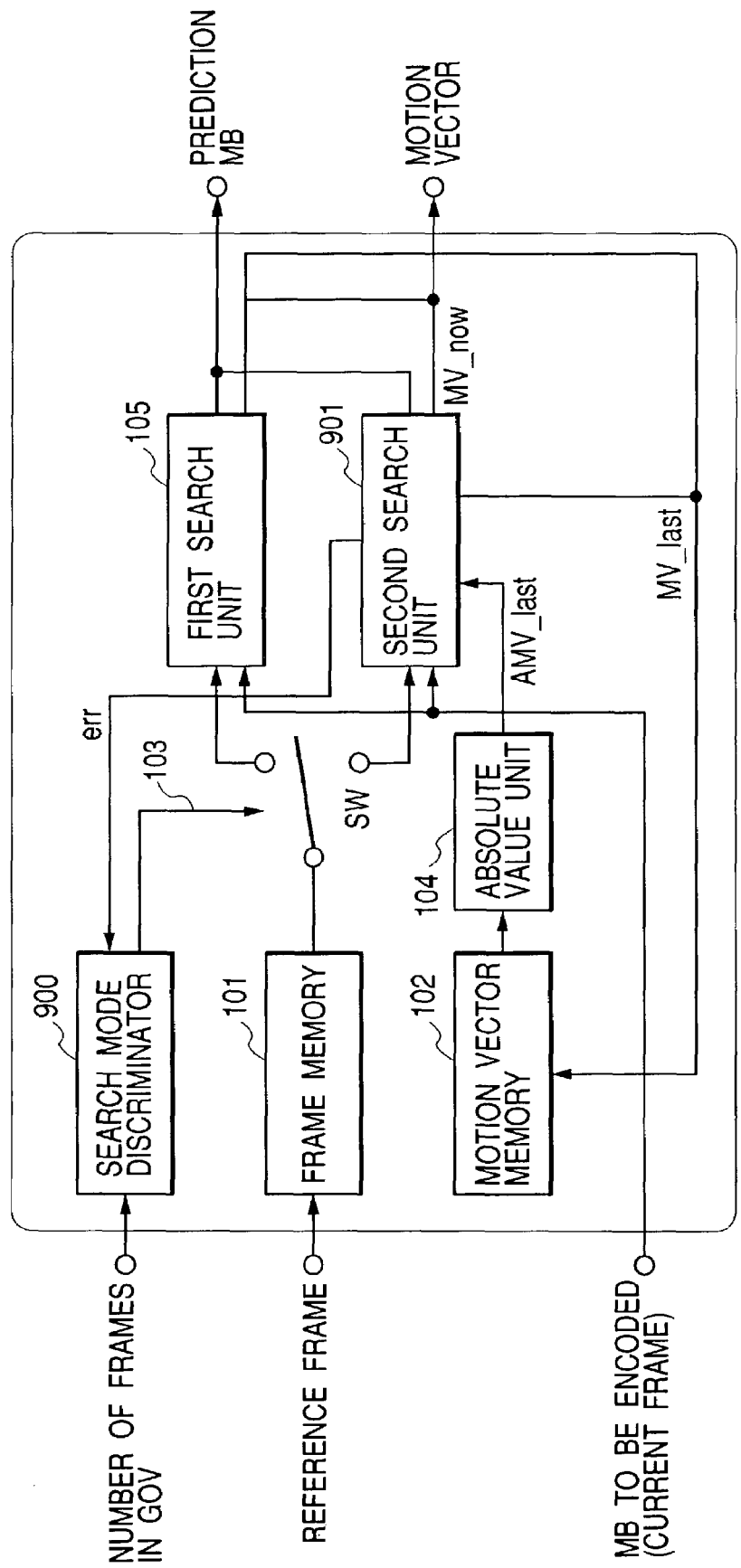
FIG. 9 is a block diagram showing a configuration of a motion vector search device according to a second embodiment of the present invention.

Referring to FIG. 9, there is shown a block diagram of a configuration of a motion vector search device for searching for a motion vector according to a second embodiment of the present invention. In FIG. 9, the same parts as in FIG. 2 are designated by the identical reference numerals to omit their description.

The second embodiment differs from the first embodiment in the search mode discriminator and the second search unit. Therefore, the following describes operations around the search mode discriminator and the second search unit. The search device in the second embodiment is also applicable to the encoding device in FIG. 7 and to the application system in FIG. 8 described in the first embodiment in the same manner.

In FIG. 9, the search mode discriminator 900 inputs a cumulative error value err of the search result in each frame (a value of accumulating differences between an MB to be encoded and a prediction MB) from the second search unit described later according to the number of frames in the input GOV and discriminates between the first search mode and the second search mode described in the first embodiment for each input frame.

A second search unit 901 performs the motion vector search on the basis of the block matching method with AMV_last processed by the absolute value unit 104 determined as a range and outputs the cumulative error value err as a search result in each frame.

The following describes an operation of the motion vector search device configured as shown in FIG. 9.

The operation begins with a discrimination of a search method of a frame to be currently processed in the search mode discriminator 900. The search mode discriminator 900 determines a search mode on the basis of the number of frames in the GOV, first. If the number of frames in the GOV is 0, the VOP is determined to be I-VOP and a local decoding frame signal is stored in the frame memory 101. If the number of frames in the GOV is 1, the VOP is determined to be P-VOP at the head of the GOV and therefore the search mode discriminator 900 outputs a switch selection signal. According to this selection signal, the first search unit 105 performs the search in the first search mode described in the first embodiment. The first search unit 105 inputs an MB to be encoded on the basis of the reference frame signal and the current frame signal, searches the given range, and outputs the prediction MB simultaneously with the motion vector MV_last as a search result. Concurrently, the motion vector MV_last is stored in the motion vector memory 102.

Figure 10:
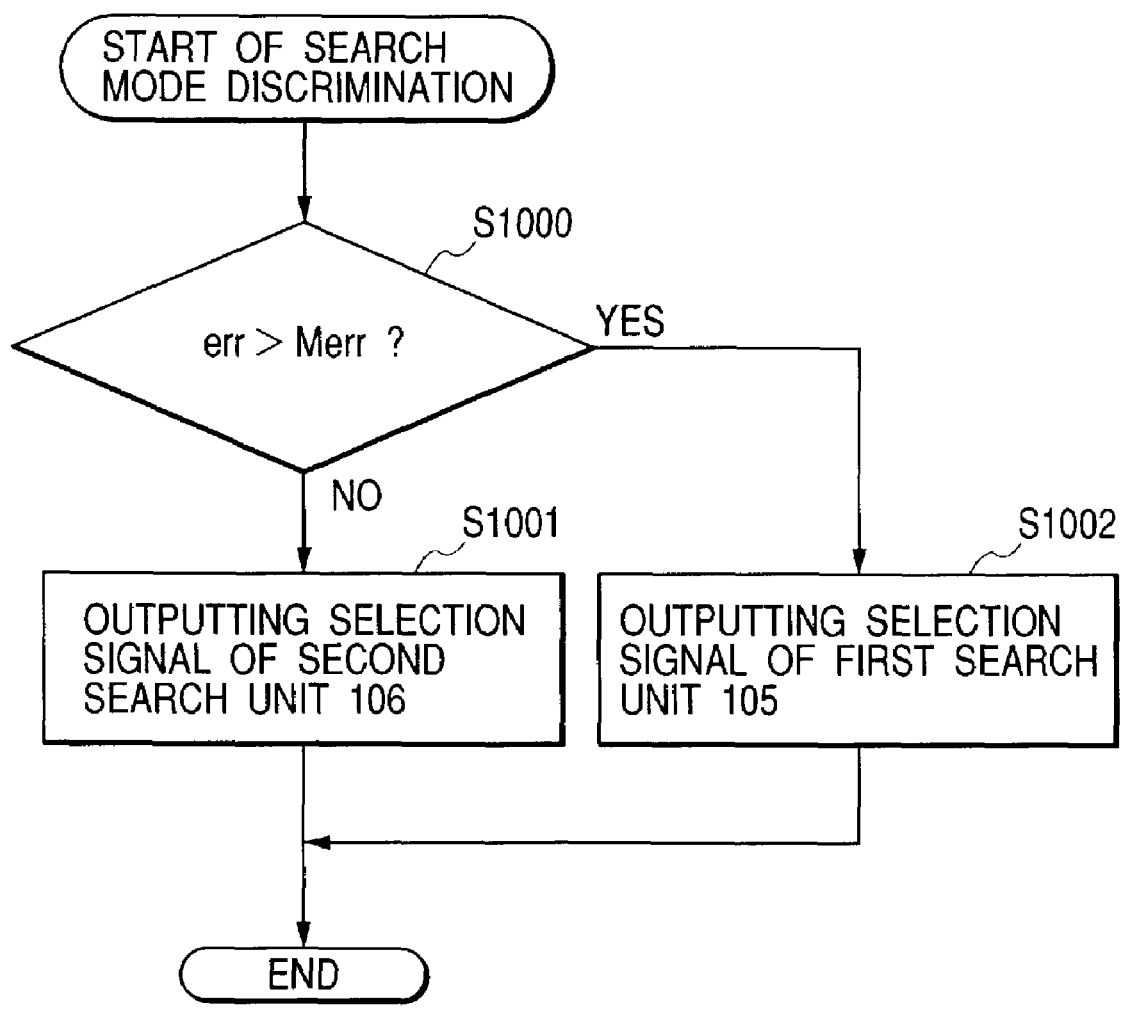
FIG. 10 is a flowchart of an operation of a search mode discriminator 900 shown in FIG. 9.

The processing operation of the search mode discriminator 900 will now be described by using a flowchart shown in FIG. 10.

If the number of frames in the GOV is 2 or more (the next frame of the first P-VOP and after), the search mode discriminator 900 compares the cumulative error value err from the second search unit 601 with the cumulative error comparison value Merr previously contained in the search mode discriminator 900 (S1000). If the cumulative error value err is greater than the cumulative error comparison value Merr, it outputs a selection signal for selecting the first search unit 105 (S1002). Otherwise, it outputs a selection signal for selecting the second search unit 901 (S1001).

As apparent from the above description, according to the second embodiment, the block matching method is applied to the predetermined fixed search range (the first search mode) in the motion vector search of frames at certain unit time intervals and a search range is determined from the motion vector obtained in the block matching method for other ranges, by which a search range can be reduced and the motion vector can be searched for at higher speed and more easily (the second search mode).

In addition, by monitoring the cumulative error value in the frame, it can discriminate cases where the range should not be reduced, which results in preventing the decoded image quality from being degraded.

Third Embodiment

Figure 11:
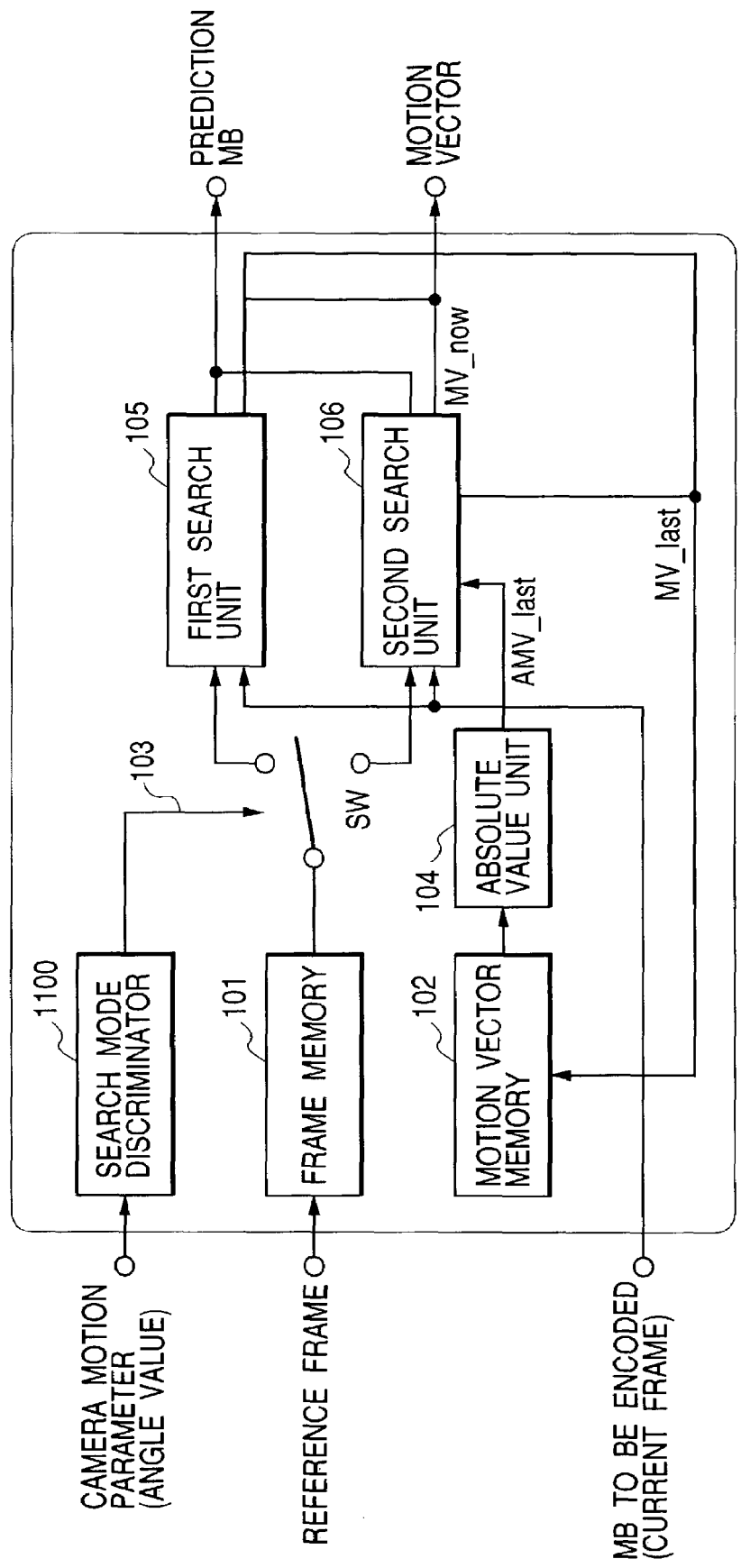
FIG. 11 is a block diagram showing a configuration of a motion vector search device according to a third embodiment of the present invention.

Referring to FIG. 11, there is shown a block diagram of a configuration of the motion vector search device according to a third embodiment of the present invention. In FIG. 11, the same parts as in FIG. 2 are designated by identical reference numerals to omit their description.

The third embodiment differs from the first embodiment in the search mode discriminator and other parts operate in the same manner. Therefore, the following describes operations around the search mode discriminator.

In FIG. 11, a search mode discriminator 1100 discriminates between the first search mode and the second search mode described in the first embodiment for each input frame according to an input motion parameter from a camera. The motion parameter indicates a change value of a change in a direction of a stationary camera such as a surveillance camera. In this embodiment, it is assumed to indicate an angle change value.

Figure 12:
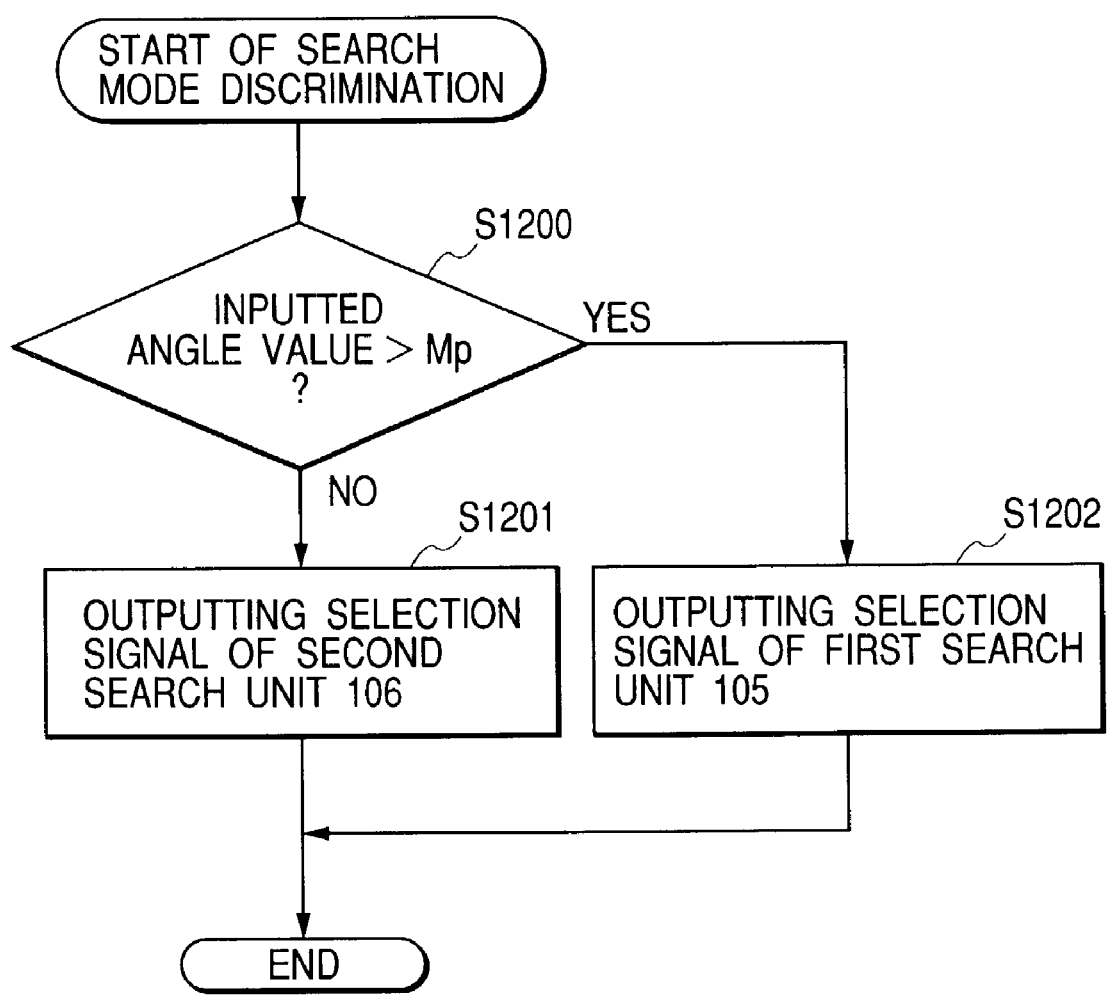
FIG. 12 is a flowchart of an operation of a search mode discriminator 1100 shown in FIG. 11.

Next, there is described an operation of the search mode discriminator 1100 by using a flowchart shown in FIG. 12.

The operation begins with a search mode discrimination of a frame to be currently processed in the search mode discriminator 1100. The search mode discriminator 1100 determines a search mode on the basis of an input motion parameter from the camera.

The input angle change value is compared with a comparison angle value Mp provided in advance (S1200). If the input angle change value is greater than the comparison angle value Mp, the search mode discriminator outputs a selection signal for selecting the first search unit 105 (S1202). Otherwise, it outputs a selection signal for selecting the second search unit 106 (S1201).

Figure 13:
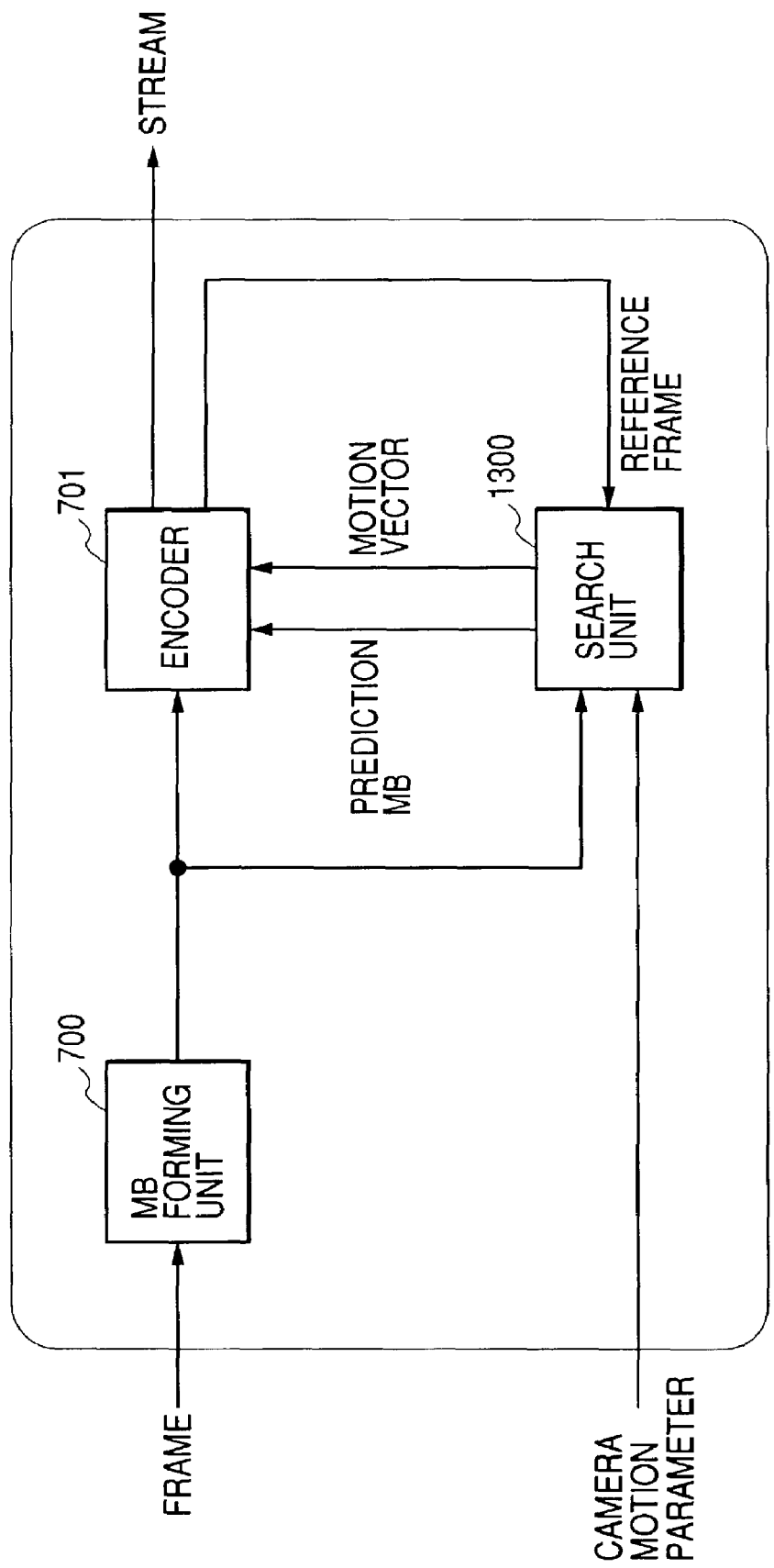
FIG. 13 is an encoding device with the motion vector search device shown in FIG. 11 in the third embodiment.

Referring to FIG. 13, there is shown an encoding device with the motion vector search device shown in FIG. 11 in the third embodiment. In FIG. 13, the same parts as in FIG. 7 are designated by identical reference numerals to omit their description.

In FIG. 13, a search unit 1300 is the motion vector search device shown in FIG. 11.

The following describes a processing operation of the encoding device configured as shown in FIG. 13.

First, the encoding device inputs a frame image to be encoded and outputs it after being divided in units of an MB by an MB forming unit 700. An encoder 701 encodes the input MBs into an MPEG-4 stream. The local-decoded MBs are stored in a search unit 1300 as a reference frame for use in encoding of the next frame. At the next frame, the encoding device inputs the reference frame stored in the search unit 1300, the current frame MB, and the camera motion parameter, performs the above search, and outputs a prediction MB and a motion vector. Then, the above operation is repeated.

Figure 14:
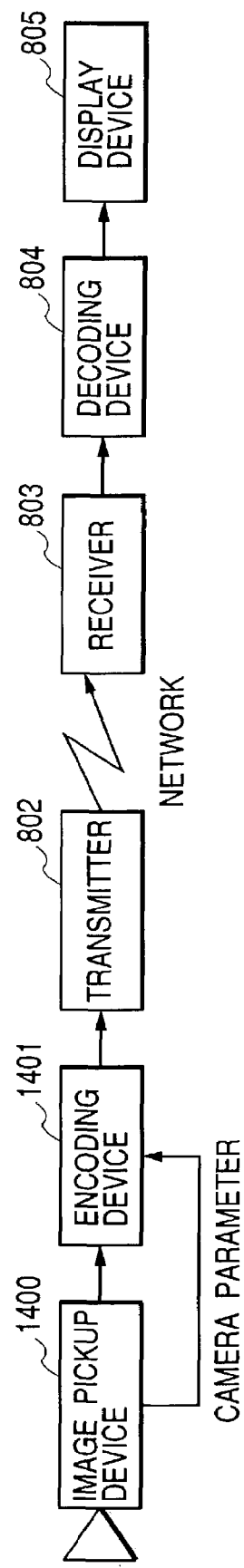
FIG. 14 is a configuration of an application system with the encoding device shown in FIG. 13 in the third embodiment.

Referring to FIG. 14, there is shown a configuration of an application system with the encoding device shown in FIG. 13 in the third embodiment. In FIG. 14, the same parts as in FIG. 8 are designated by identical reference numerals to omit their description.

An image pickup device 1100 is a camera, which is an image pickup device for taking an image and outputting an image signal and which outputs a parameter indicating a camera motion. An encoding device 1401 is the encoding device shown in FIG. 13.

As apparent from the above description, according to the third embodiment, the block matching method is applied to the predetermined fixed search range (the first search mode) in the motion vector search of frames at certain unit time intervals and a search range is determined from the motion vector obtained in the block matching method for other ranges, by which a search range can be reduced and the motion vector can be searched for at higher speed and more easily (the second search mode).

In addition, by inputting the camera parameter to cause the search range to follow the camera motion, the search range can be easily determined, which results in preventing the decoded image quality from degrading.

While the camera parameter is assumed to be an angle value in the third embodiment, any of other parameters can be used to indicate the camera motion.

Fourth Embodiment

A computer can execute the processes with the motion vector search device and the encoding device described in the above first to third embodiments.

Figure 15:
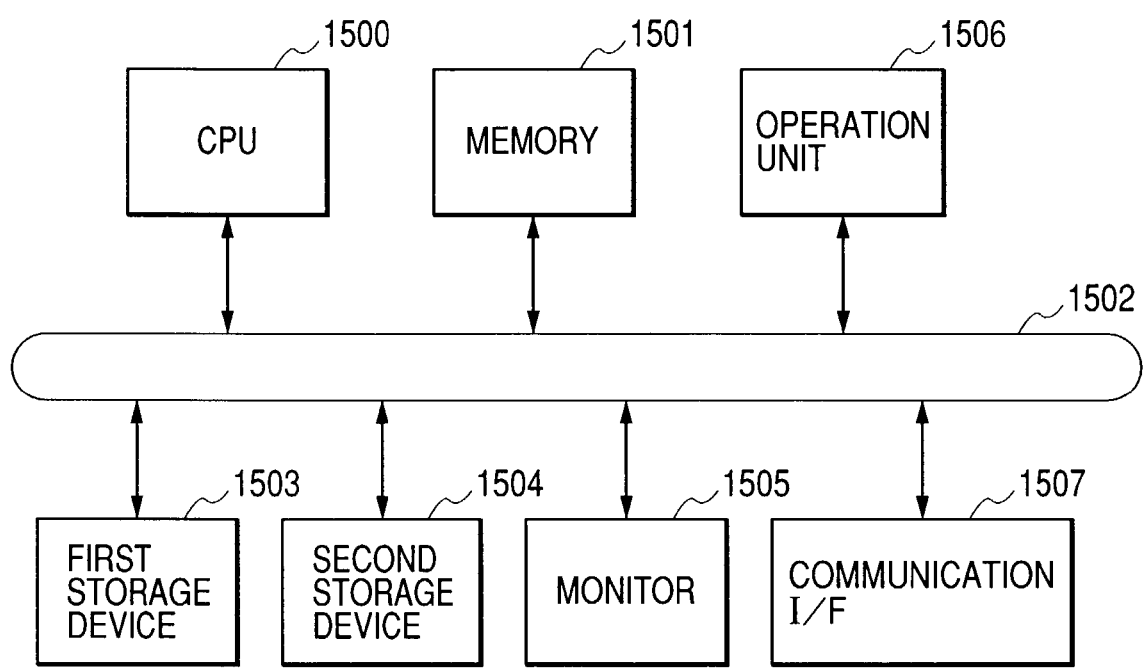
FIG. 15 is a block diagram showing a configuration of a computer of an embodiment according to the present invention.

Referring to FIG. 15, there is shown a block diagram of a configuration of a computer of an embodiment according to the present invention.

A central processing unit (CPU) 1500 controls the entire computer and performs various processes. A memory 1501 stores an operating system (OS) for controlling the entire computer and operating various types of software, and the software to be operated, having an area in which the image data is read for encoding, a code area for temporarily storing coded data, and a working area for storing parameters for various arithmetical operations. A bus 1502 is a channel for connecting various devices with each other to exchange data or control signals.

A first storage device 1503 stores various types of software. A second storage device 1504 stores video data. A monitor 1505 displays images or system messages from the computer.

A communication interface 1507, which is for use in transmitting encoded data to a communications circuit, is connected to a LAN outside the apparatus, a public circuit, a radio circuit, airwaves, and the like. A terminal 1506 starts the computer and sets a bit rate or other various conditions.

The following describes an operation in FIG. 15. In the above configuration, before starting the processing, the terminal 1506 selects video data to be encoded out of video data stored in the second storage device 1504 to instruct a startup of the computer. Then, software stored in the first storage device 1503 is loaded into the memory 1501 via the bus 1502 and the software is started. The encoding operation of the video data stored in the second storage device 1504 using the CPU 1500 corresponds to the execution of the program code (the above software) following the flowchart shown in FIGS. 5 and 6, FIG. 10, or FIG. 12.

As set forth hereinabove, the computer shown in the fourth embodiment functions as a device realizing the motion vector search in the first to third embodiments.

The first to fourth embodiments provide motion vector search methods giving an effect similar to a fixed range search type block matching method in a low-speed circuit of a videophone, a video conference, or the like and reducing the number of search times in a simple method.

Apparently all of the above embodiments have been described only to show illustrations in concrete forms in working of the present invention, but the technical scope of the present invention should not be limited in interpretation by these embodiments. In other words, the present invention can be worked in various forms without departing from the technical idea or the main features of the invention.

What is claimed is:

1. An image processing apparatus comprising:
   a) first motion vector detecting means for searching for a motion vector of an N-th input frame in a fixed search range on the basis of image data of the N-th input frame and image data of an (N-1)th input frame;
   b) second motion vector detecting means for setting a search range for performing a motion vector search within a search range not exceeding said fixed search range according to a detected motion vector of the (N-1)th input frame and for searching a motion vector of the N-th input frame within the set search range on the basis of the image data of the N-th input frame and the image data of the (N-1)th input frame and for calculating an accumulated value of differences between a macro block to be encoded and a prediction macro block; and
   c) selecting means for selecting to perform a process using said first motion vector detecting means without performing the process using said second motion vector detecting means in a case where the (N-1)th input frame is encoded using an intra-encoding mode, for selecting to perform a process using said first motion vector detecting means without performing the process using said second motion vector detecting means in a case where the (N-1)th input frame is encoded using an inter-encoding mode and the accumulated value of differences between a macro block to be encoded and a prediction macro block calculated by the second motion vector detecting means is greater than a predetermined value, and for selecting to perform a process using said second motion vector detecting means without performing the process using said first motion vector detecting means in a case where the (N-1)th input frame is encoded using the inter-encoding mode and the accumulated value is not greater than the predetermined value, wherein said selecting means selects only one of said first motion vector detecting means and said second motion vector detecting means to perform a process for the N-th input frame.

2. An image processing method comprising:

a) a first motion vector detecting step for searching for a motion vector of an N-th input frame in a fixed search range on the basis of image data of the N-th input frame and image data of an (N-1)th input frame;

b) a second motion vector detecting step for setting a search range for performing a motion vector search within a search range not exceeding said fixed search range according to a detected motion vector of the (N-1)th input frame and for searching for a motion vector of the N-th input frame within the set search range on the basis of the image data of the N-th input frame and the image data of the (N-1)th input frame and for calculating an accumulated value of differences between a macro block to be encoded and a prediction macro block; and c) a selecting step for selecting to perform a process using said first motion vector detecting step without performing the process using said second motion vector detecting step in a case where the (N-1)th input frame is encoded using an intra-encoding mode, for selecting to perform a process using said first motion vector detecting step without performing the process using said second motion vector detecting step in a case where the (N-1)th input frame is encoded using an inter-encoding mode and the accumulated valve of differences between a macro block to be encoded and a prediction macro block calculated by the second motion vector detecting means is greater than a predetermined value, and for selecting to perform a process using said second motion vector detecting step without performing the process using said first motion vector detecting step in case where the (N-1)th input frame is encoded using the inter-encoding mode and the accumulated value is not greater than the predetermined value, wherein said selecting step selects only one of said first motion vector detecting step and said second motion vector detecting step to perform a process for the N-th input frame.

3. A computer-readable recording medium, which has a record of a program for causing a computer to execute:

a) a first motion vector detecting step for searching for a motion vector of an N-th input frame in a fixed search range on the basis of image data of the N-th input frame and image data of an (N-1)th input frame;

b) a second motion vector detecting step for setting a search range for performing a motion vector search within a search range not exceeding said fixed search range according to a detected motion vector of the (N-1)th input frame and for searching a motion vector of the N-th input frame within the set search range on the basis of the image data of the N-th input frame and the image data of the (N-1)th input frame and for calculating an accumulated value of differences between a macro block to be encoded and a prediction macro block; and c) a selecting step for selecting to perform a process using said first motion vector detecting step without performing the process using said second motion vector detecting step in a case where the (N-1)th input frame is encoded using an intra-encoding mode, for selecting to perform a process using said first motion vector detecting step without performing the process using said second motion vector detecting step in a case where the (N-1)th input frame is encoded using an inter-encoding mode and the accumulated value of differences between a macro block to be encoded and a prediction macro block calculated by the second motion vector detecting means is greater than a predetermined value, and for selecting to perform a process using said second motion vector detecting step without performing the process using said first motion vector detecting step in a case where the (N-1)th input frame is encoded using the inter-encoding mode and the accumulated value is not greater than the predetermined value, wherein said selecting step selects only one of said first motion vector detecting step and said second motion vector detecting step to perform a process for the N-th frame.

* * * * *